(12) United States Patent
Huntzinger

(10) Patent No.: US 11,579,003 B2
(45) Date of Patent: *Feb. 14, 2023

(54) PRESSURE SENSOR WITH CONTOURED MATING FACE

(71) Applicant: Honeywell International Inc., Charlotte, NC (US)

(72) Inventor: Bradley Huntzinger, Columbus, OH (US)

(73) Assignee: Honeywell International Inc., Charlotte, NC (US)

( * ) Notice: Subject to any disclaimer, the term of this patent is extended or adjusted under 35 U.S.C. 154(b) by 110 days.

This patent is subject to a terminal disclaimer.

(21) Appl. No.: 16/949,436

(22) Filed: Oct. 29, 2020

(65) Prior Publication Data
US 2021/0262841 A1 Aug. 26, 2021

Related U.S. Application Data

(63) Continuation of application No. 16/796,037, filed on Feb. 20, 2020, now Pat. No. 10,852,166.

(51) Int. Cl.
*G01F 1/40* (2006.01)

(52) U.S. Cl.
CPC .................................. *G01F 1/40* (2013.01)

(58) Field of Classification Search
None
See application file for complete search history.

(56) References Cited

U.S. PATENT DOCUMENTS

| 3,960,018 | A | 6/1976 | Change et al. |
| 5,665,920 | A | 9/1997 | Martin |
| 5,905,196 | A | 5/1999 | Parshall |
| 10,852,166 | B1 * | 12/2020 | Huntzinger ............. G01L 19/06 |
| 2007/0068286 | A1 | 3/2007 | Piper |

(Continued)

FOREIGN PATENT DOCUMENTS

| CN | 107941382 A | 4/2018 |
| CN | 108871662 A | 11/2018 |

(Continued)

OTHER PUBLICATIONS

Non-Final Rejection dated Apr. 20, 2020 for U.S. Appl. No. 16/796,037.

(Continued)

*Primary Examiner* — Harshad R Patel
(74) *Attorney, Agent, or Firm* — Alston & Bird LLP

(57) ABSTRACT

A pressure sensor assembly and method of manufacturing the same are provided. The pressure sensor assembly includes a contoured sensing insert. The contoured sensing insert includes an outer sensing insert having an open interior through-hole and a top contoured surface configured to be secured at least partially within the fluid flow container. The top contoured surface has a surface contour corresponding with an interior wall contour of the fluid flow container. The contoured sensing insert also includes an inner sensing medium defined within the through-hole of the outer sensing insert. The inner sensing medium defines a conforming contoured surface at least substantially matching the surface contour of the top contoured surface. A corresponding method of manufacturing is also provided.

20 Claims, 6 Drawing Sheets

(56) References Cited

U.S. PATENT DOCUMENTS

| | | |
|---|---|---|
| 2015/0233869 A1 | 8/2015 | Barrett et al. |
| 2017/0292897 A1 | 10/2017 | Kishimoto |
| 2018/0023448 A1 | 1/2018 | Zhang |
| 2018/0106694 A1 | 4/2018 | Kusanale et al. |
| 2018/0217018 A1 | 8/2018 | Eckhardt et al. |
| 2018/0306659 A1 | 10/2018 | Wade et al. |

FOREIGN PATENT DOCUMENTS

| | | |
|---|---|---|
| EP | 3392634 A2 | 10/2018 |
| JP | H0835896 A | 2/1996 |

OTHER PUBLICATIONS

Extended European Search Report issued in European Application No. 21156434.9 dated Jul. 19, 2021, 8 pages.
Notice of Allowance and Fees Due (PTOL-85) dated Jul. 31, 2020 for U.S. Appl. No. 16/796,037.
CN Office Action dated Aug. 26, 2022 for CN Application No. 202110188306.

* cited by examiner

PRESSURE SENSOR WITH CONTOURED MATING FACE

CROSS REFERENCE TO RELATED APPLICATION

This application is a continuation of U.S. patent application Ser. No. 16/796,037, filed Feb. 20, 2020, which is incorporated herein by reference in its entirety.

FIELD OF THE INVENTION

The present disclosure relates generally to pressure sensors, and more particularly, to disposable pressure sensors.

BACKGROUND OF THE INVENTION

Disposable pressure sensors may be incorporated into fluid delivery tubes, such as in fluid delivery tubes utilized in the medical industry, for example, for delivering fluid to patients. These disposable sensors have historically been universally applied, such that the sensors are not provided specifically for interaction with specific fluid delivery tubes. Accordingly, the interface between the disposable sensor and the fluid delivery tube may create areas of turbulent fluid flow, which may encourage the undesirable formation of bubbles within the fluid delivery tubes. Through applied effort, ingenuity, and innovation, many of these identified problems have been solved by the methods and apparatus of the present disclosure.

BRIEF SUMMARY OF THE INVENTION

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In an example embodiment, a pressure sensor assembly configured for sensing a fluid pressure within a fluid flow container is provided. The pressure sensor assembly includes a contoured sensing insert. The contoured sensing insert includes an outer sensing insert having an open interior through-hole and a top contoured surface configured to be secured at least partially within the fluid flow container. The top contoured surface has a surface contour corresponding with an interior wall contour of the fluid flow container. The contoured sensing insert also includes an inner sensing medium defined within the through-hole of the outer sensing insert. The inner sensing medium defines a conforming contoured surface at least substantially matching the surface contour of the top contoured surface.

In some embodiments, the fluid flow container defines a tubular shape configured with a thorough hole configured to receive a flow of fluid during operation. In some embodiments, the conforming contoured surface of the inner sensing medium is configured for direct contact with a fluid flowing through the fluid flow container. In some embodiments, the top contoured surface of the outer sensing insert and the conforming contoured surface of the inner sensing medium are configured to fit flush with an interior curvature of the through-hole of the fluid flow container.

In some embodiments, the outer sensing insert further defines an annular protrusion surrounding an exterior surface of the outer sensing insert. In such an embodiment, the annular protrusion is configured to engage a coupling gasket to operably couple the outer sensing insert with the fluid flow container. In some embodiments, at least one of the coupling gasket or the inner sensing medium includes a silicone rubber material. In some embodiments, the outer sensing insert includes a silicone compatible plastic.

In some embodiments, the outer sensing insert defines a bottom surface opposite the top contoured surface, wherein a base element is attached to the bottom surface. In some embodiments, a sensing die is attached to the base element, such that the sensing die is positioned within the inner sensing medium.

In another example embodiment, a method of manufacturing a pressure sensor assembly is provided. The method includes providing an outer sensing insert having an open interior through-hole and a top contoured surface configured to be secured at least partially within the fluid flow container. The top contoured surface has a surface contour corresponding with an interior wall contour of the fluid flow container. The method also includes dispensing an inner sensing medium within the through-hole of the outer sensing insert to define a conforming contoured surface at least substantially matching the surface contour of the top contoured surface. The method further includes curing the inner sensing medium within the through-hole of the outer sensing insert.

In some embodiments, the method also includes securely coupling the outer sensing insert to a fluid flow container via a coupling gasket. In such an embodiment, in an instance in which the contoured sensing insert is coupled with the fluid flow container, the top contoured surface and the conforming contour surface are approximately flush with an interior surface of the fluid flow container. In some embodiments, the fluid flow container defines a tubular shape configured with a thorough hole configured to receive a flow of fluid during operation. In some embodiments, the conforming contoured surface of the inner sensing medium is configured for direct contact with a fluid flowing through the fluid flow container.

In some embodiments, the outer sensing insert further defines an annular protrusion surrounding an exterior surface of the outer sensing insert. In such an embodiment, the annular protrusion is configured to engage a coupling gasket to operably couple the outer sensing insert with the fluid flow container. In some embodiments, at least one of the coupling gasket or the inner sensing medium includes a liquid silicone rubber. In some embodiments, the outer sensing insert includes a silicone compatible plastic.

In some embodiments, the method also includes attaching a bottom surface of the outer sensing insert opposite the top contoured surface to a base element. In some embodiments, the method also includes attaching the sensing die to the base element, wherein the sensing die is positioned within the inner sensing medium.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed.

DETAILED DESCRIPTION OF THE INVENTION

Figure 1:
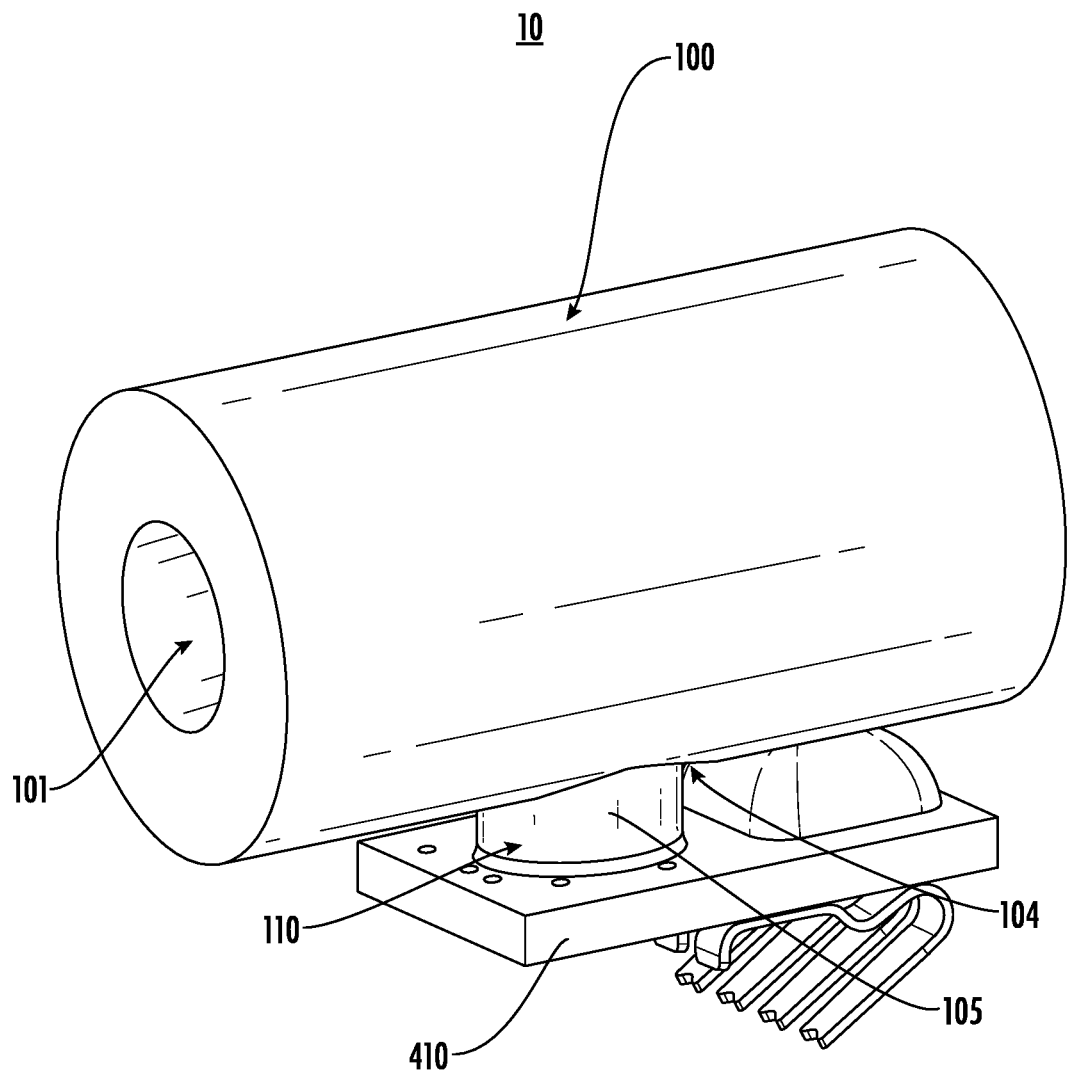
FIG. 1 illustrates an example pressure sensor assembly for use in various embodiments.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. The following brief definition of terms shall apply throughout the application:

The term "comprising" means including but not limited to, and should be interpreted in the manner it is typically used in the patent context. The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment). If the specification describes something as "exemplary" or an "example," it should be understood that refers to a non-exclusive example; The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the present disclosure generally relate to force sensors that may be configured for sensing fluid pressures, for example, within a fluid flow tube or other contained volume of fluid (e.g., a flowing volume of fluid). Embodiments of the present disclosure may be used in various applications, such as in medical applications. For example, various embodiments are directed to pressure sensors configured for direct interaction with a fluid (e.g., a fluid provided in a medical context) via coupling between the pressure sensor and a fluid flow. Such embodiments address various needs within industries, such as in the medical industry, in which there is an increasing need for disposable medical equipment that allows for accurate measurements while maintaining low costs. Various embodiments of the present disclosure allow for an improved interaction between the pressure sensor and the fluid flow path for which a pressure is being measured, which may provide a consistent (and laminar, for example) flow along the fluid flow path, with minimal interference of the fluid flow that may otherwise result in trapped bubbles in the fluid. Particularly in the medical industry, bubbles (e.g., gas bubbles, such as air bubbles) within a liquid fluid flow may be highly undesirable, as the liquid fluid may be passed directly into a patient's body (e.g., into a patient's blood stream), where bubbles may create substantial and/or severe medical problems for the patient.

The disclosed pressure sensor assembly as described herein, may be suitable for use in use in approximately 0 to 300 mmHg pressure environments (e.g., about 0 to 6 psi with a proof pressure of 100 psi). It should be understood that various pressure sensor assemblies provided in accordance with certain embodiments may be usable within narrow pressure ranges (e.g., only high pressure ranges, only low pressure ranges and/or the like), for example, due to the configuration of the sensor die itself, however it should be understood that the embodiments discussed herein may be usable in any of a variety of pressure ranges.

FIG. 1 illustrates an example pressure sensor assembly secured within a fluid flow container 100 in accordance with certain embodiments. In various embodiments, the pressure sensor assembly 10 may include a contoured sensing insert 110. The contoured sensing insert 110 may be configured to engage with a fluid flow container 100. As shown, the pressure sensor assembly may be secured within the fluid flow container 100 (e.g., a round fluid delivery tube) having an at least substantially circular exterior cross sectional shape (having a corresponding exterior radius of curvature) and defining a corresponding at least substantially circular interior passage (having a corresponding interior radius of curvature) 101. As shown in the illustrated embodiment, the fluid flow container 100 may have an at least substantially uniform wall thickness (measured between an exterior surface of the fluid flow container 100 and an interior surface of the fluid flow container 100). However, it should be understood that the fluid flow container 100 may have other cross-sectional shapes, such has having a uniform or non-uniform radius of curvature (e.g., elliptical, oval-shaped, oblong, and/or the like). As discussed herein, at least a portion of the interior surface of the fluid flow container 100 may have a uniform radius of curvature (e.g., the portion interacting with the pressure sensor assembly). As shown, the fluid flow container 100 may define a sidewall aperture 104 extending through a sidewall of the fluid flow container 100 (e.g., through both the exterior surface and the interior surface of the fluid flow container 100) configured to receive a contoured sensing insert 110 therein. As discussed herein, the contoured sensing insert 110 may be positioned such that a sensing die within or in communication with the contoured sensing insert may determine the pressure of the fluid flowing through the fluid flow container 100. As discussed in more detail below, the contoured sensing insert 110 may be attached to a substrate 410 configured with a sensing die and the like.

Figure 2A:
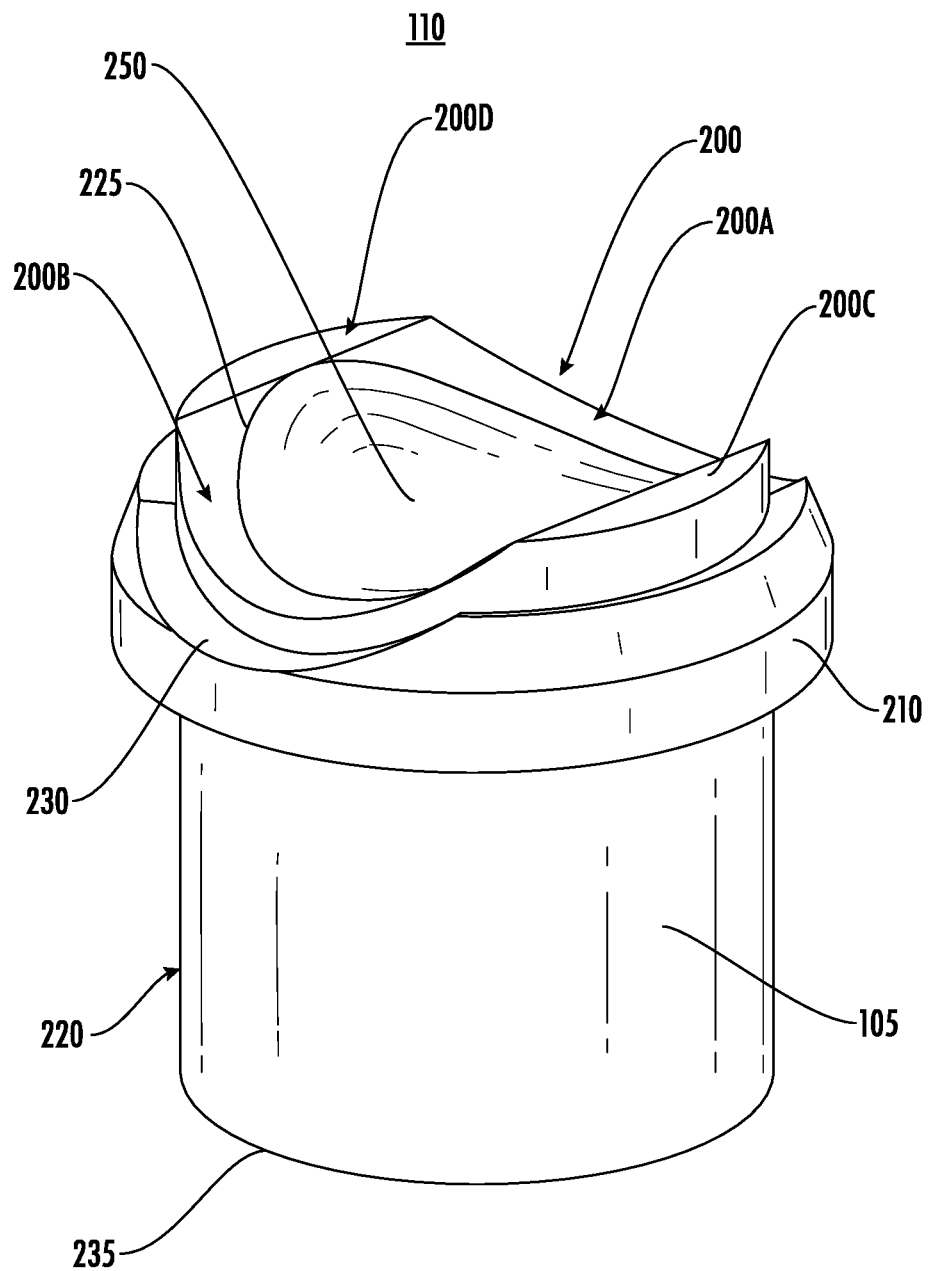
FIG. 2A illustrates an outer sensing insert configured for interaction with the fluid flow container via a coupling gasket in accordance with various embodiments.
Figure 3A:
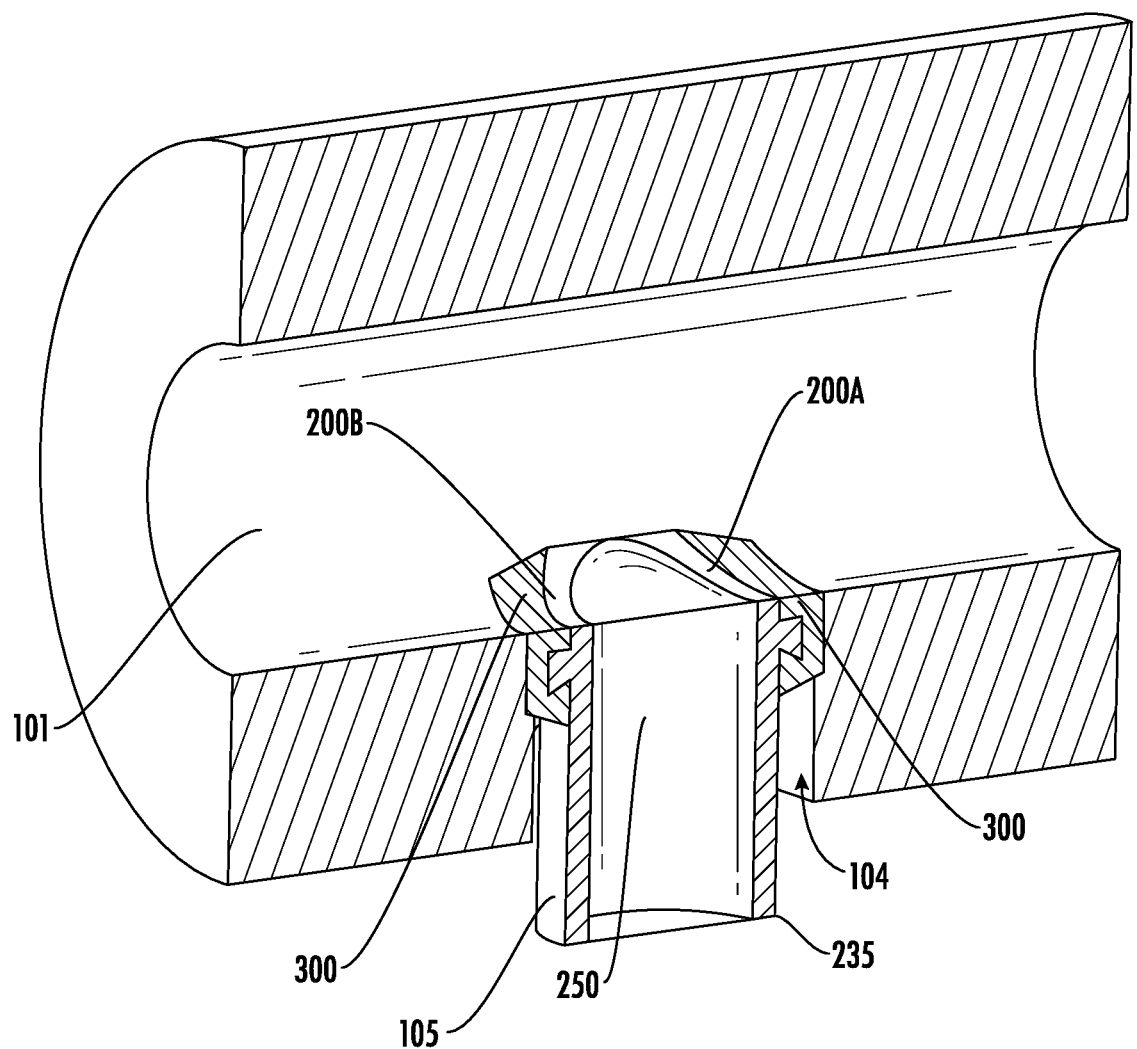
FIGS. 3A and 3B illustrate multiple views of the mating between the fluid flow container of the pressure sensor assembly and the contoured sensing insert in accordance with various embodiments.
Figure 3B:
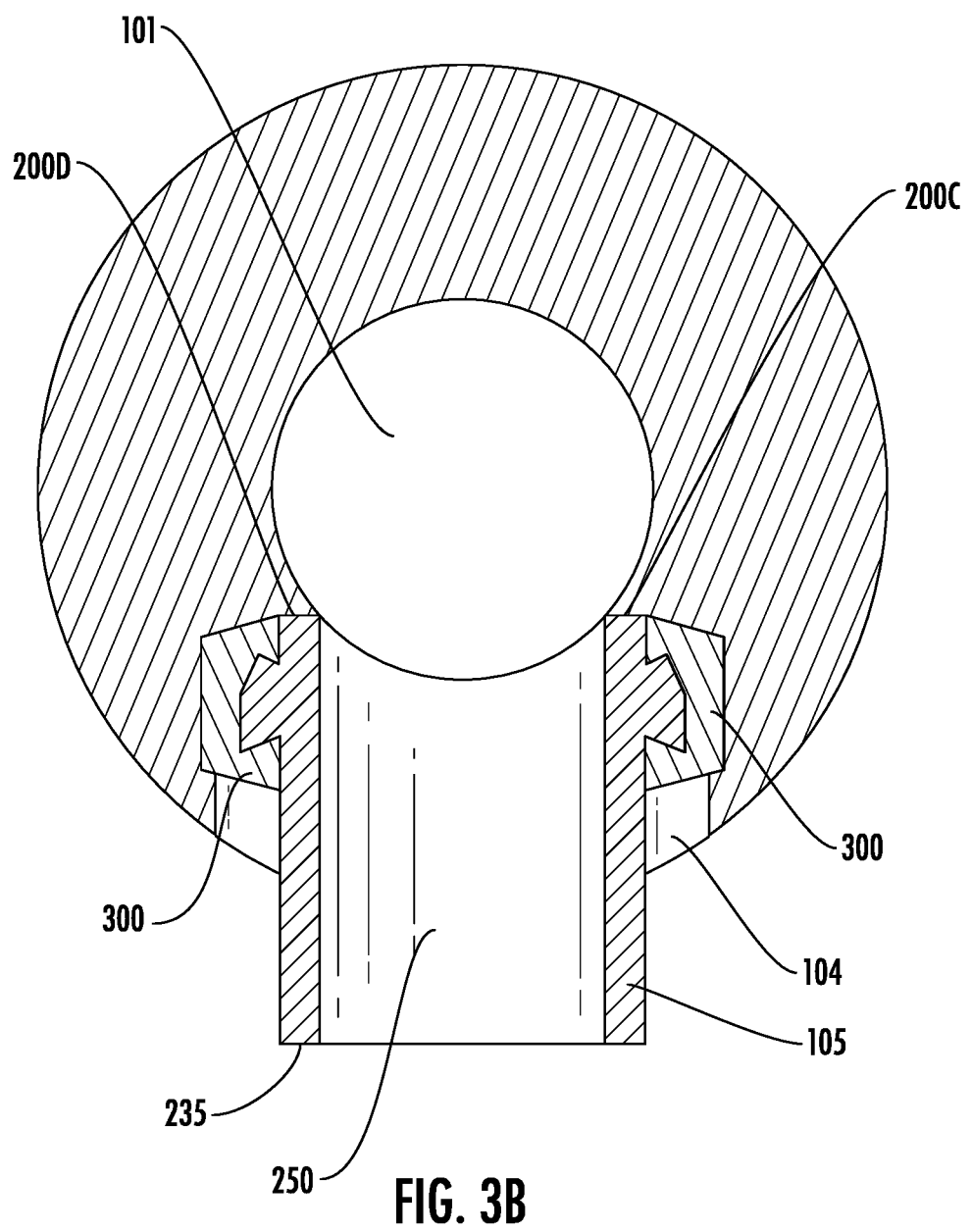

FIG. 2A illustrates an outer sensing insert configured to be coupled with the fluid flow container 100 (e.g., within a sidewall aperture 104) to enable direct contact between a fluid flowing within the fluid delivery tube and an inner sensing medium 250 as discussed herein. In various embodiments, the outer sensing insert 105 may comprise a hollow tubular shape extending between a lower end and an upper end. The outer sensing insert 105 may thus define an exterior surface of the outer sensing insert 105 and an interior surface of the outer sensing insert 105 surrounding a through-hole 225 of the outer sensing insert 105. The lower end of the outer sensing insert 105 may be configured to be secured relative to additional sensor components (e.g., a substrate, such as a printed circuit board (PCB), having a sensing die disposed thereon, such that the outer sensing insert 105 surrounds the sensing die). The upper end of the outer sensing insert 105 may define an interface surface 200 corresponding with a contour of the interior of the fluid flow container 100. For example, the interface surface 200 of the illustrated embodiment defines a radius of curvature at least substantially matching the radius of curvature of the interior surface of the fluid flow container 100 into which the sensor assembly is placed. Accordingly, the interface surface 200 of the outer sensing insert 105 creates an at least substantially smooth composite sidewall of the fluid delivery tube, thereby providing at least substantially uninterrupted fluid flow through the fluid delivery tube and across the interface surface 200 of the outer sensing insert 105. Moreover, it should be understood that the interface surface 200 may be provided specifically for the size and/or configuration of the fluid delivery tube (e.g., the shape of the interface surface 200 may be made during the molding process based on the specific fluid delivery tube being used). As such, the outer sensing insert 105 may be orientation dependent, such that the fluid flow container interface surface 200 may define a first curved surface 200A and a second curved surface 200B that, as shown in FIGS. 3A and 3B, is configured to be positioned along the curvature of the fluid flow container 100. In various embodiments, the fluid flow container interface surface 200 may also define a first level surface 200C and a second level surface 200D configured to interface with the sidewall aperture of the fluid flow container and separating the first curved surface 200A and the second curved surface 200B. However, it should be understood that in certain embodiments, the first curved surface 200A and the second curved surface 200B may be continuously connected, thereby providing a single, continuous curved surface around the perimeter of the outer sensing insert 105.

As shown in FIG. 2A, various embodiments of the outer sensing insert 105 includes a cylindrical base 220 configured with a through-hole configured approximately perpendicular to the fluid flow container interface surface 200. In various embodiments, the exterior surface of the outer sensing insert 105 defines an annular protrusion 210 configured to securely engage (e.g., via interference fit) a coupling gasket or other coupling material (e.g., an adhesive, a gel, and/or the like) as discussed in reference to FIGS. 3A and 3B. In some embodiments, the annular protrusion may also define a curved surface 230 corresponding to the curved surfaces 200A and 200B of the fluid flow container interface surface 200.

Figure 2B:
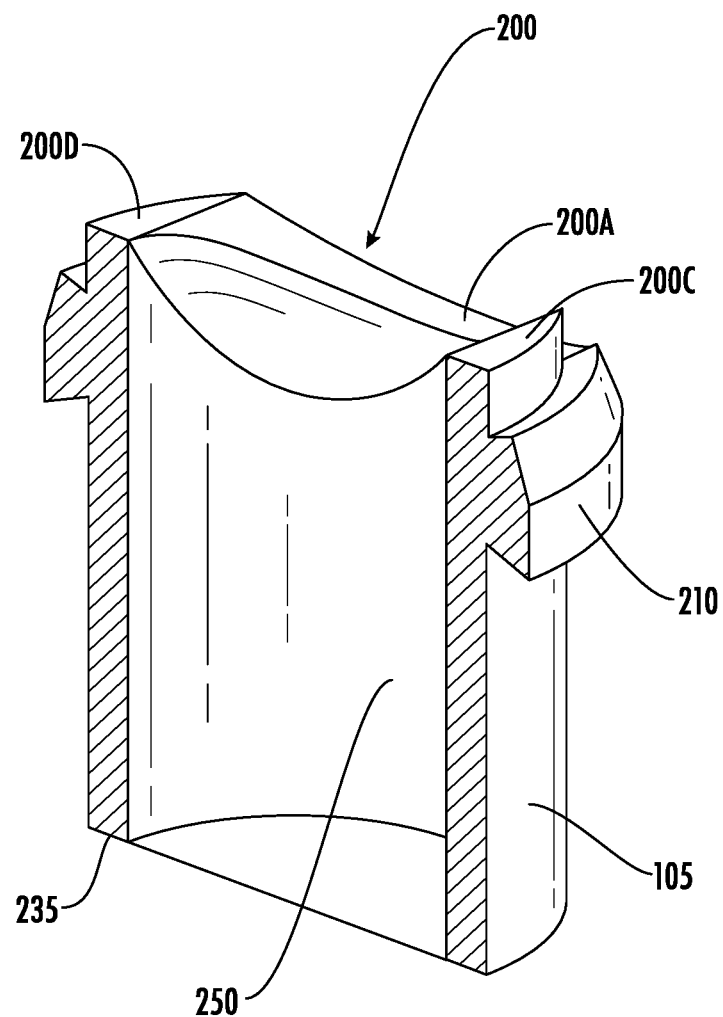
FIG. 2B illustrates a cut-away view of the outer sensing insert for interaction with the inner sensing medium in accordance with various embodiments.

In various embodiments, as shown in FIG. 2B, the outer sensing insert 105 may comprise a silicone compatible plastic, such that a silicone gel may bind, adhere, or otherwise stick to interior surface of the outer sensing insert 105. For example, the outer sensing insert 105 comprise a plastic resin (e.g., Valox Resin HX420HP).

As shown in FIG. 2A, the outer sensing insert 105 may be configured within the through-hole 225 of the outer sensing insert 105 configured to receive the inner sensing medium 250. As shown, the inner sensing medium 250 may have a shape corresponding with the interior surface of the outer sensing insert 105. The inner sensing medium 250 may additionally define a lower end (e.g., which may cover and/or otherwise contact a sensing die, a substrate (e.g., a PCB), and/or other components located at a lower end of the sensor assembly (not shown). The inner sensing medium 250 may additionally define a top surface, positioned opposite the lower end and having a shape corresponding with the shape of the upper end of the outer sensing insert 105. For example, the top surface of the inner sensing medium 250 (shown in FIG. 2A) may define a contour (e.g., a curvature) corresponding with (e.g., at least substantially matching) the contour (e.g., the curvature) of the first curved surface 200A and the second curved surface 200B, such that the composite upper surface of the sensing assembly is at least substantially continuous, having a smooth curved surface without abrupt changes in contour (e.g., formed by corners, lips, ridges, burrs, and/or the like). In some embodiments, the height of the curvature may be based on the curvature of the fluid flow container 100. Additionally, the size of the outer sensing insert 105 may depend on the size of the entire sensor assembly 10 (e.g., the size of the components may be scaled based on the application used). In various embodiments, the inner sensing medium 250 may comprise a resilient polymer (e.g., a silicone rubber material) configured to bond with the outer sensing insert 105 and fill the through-hole 225 of the outer sensing insert 105. The inner sensing medium 250 have be in a resilient solid form at room temperature, and may be dispensed in situ within the outer sensing insert 105 by providing the inner sensing medium 250 into the through hole of the outer sensing insert 105 in liquid form. The inner sensing medium 250 may be further characterized as having sufficient adhesion characteristics while in liquid form to enable the liquid inner sensing medium material to adhere to the interior sidewalls of the outer sensing insert 105 and to take the shape of the first curved surface 200A and the second curved surface 200B. Moreover, the inner sensing medium 250 may be further characterized as having sufficient surface tension and cohesive characteristics while in liquid form such that the liquid inner sensing medium material maintains a contoured upper surface so as to provide an upper surface having a contour matching the contour of the first curved surface 200A and the second curve surface 200B. For example, the inner sensing medium 250 may be a Silpuran liquid silicone rubber (e.g., Silpuran 2130). As discussed in reference to FIG. 4 below, once set into solid form, the inner sensing medium 250 may be configured to translate the pressure of the fluid flowing through the fluid flow container 100 to a sensing element (e.g., a sensing die). In various embodiments, the bottom surface 235 of the outer sensing insert 105 may be attached to another surface such that the inner sensing medium 250 may be bound by the surface.

FIGS. 3A and 3B illustrate cut-away views of the mating between the fluid flow tube and the sensing insert. FIG. 3A illustrates a cross-section of the through-hole 101 of the fluid flow container 100 with the contoured sensing insert 110 is operably coupled. As shown, the outer sensing insert 105 may be oriented such that the first curved surface 200A and the second curved surface 200B are in alignment with the curvature of the interior surface of the through-hole 101. In various embodiments, the outer sensing insert 105 may be operably coupled to the fluid flow container via coupling gasket 300, which may provide adhesive characteristics to secure the outer sensing insert 105 within the sidewall aperture 104 of the fluid flow container 100. In various embodiments, the coupling gasket 300 may be a cured or otherwise set silicone rubber material (e.g., provided in a gel/liquid form during application and set/cured thereon) configured to securely couple the outer sensing insert 105 with the sidewall aperture 104 of the fluid flow container. For example, the liquid silicone rubber may cure, such that the coupling gasket 300 is a solid. In an example embodiment, the coupling gasket 300 may be manufactured via a molding process (e.g., molded over a plastic ring). In some embodiments, the coupling gasket may have self-adhesive properties configured to attach to the outer sensing insert 105 and the fluid flow container 100. For example, the coupling gasket 300 may be a Silpuran liquid silicone rubber (e.g., Silpuran 6760/50). As shown, the coupling gasket 300 may be configured to align with the fluid flow container interface surface 200, such that the coupling gasket 300 defines a curvature approximate to the curvature of the through-hole 101. As such, in various embodiments, the contoured sensing insert 110 may fit flush with the interior surface of the through-hole 101 of the fluid flow container 100, such that there is a smooth transition of the fluid during movement through the through-hole. As shown in FIG. 3B, in some embodiments, the sidewall aperture 104 may be configured to have a varying cross-section, such the first level surface 200C and the second level surface 200D of the fluid flow container interface surface 200 may engage with the sidewall aperture 104, such that the vertical motion of the contoured sensing insert 110 may be reduced. In various embodiments, the rotational protrusions 210 may be provided such that the coupling gasket 300 may have more surface to bond thereon. In some embodiments, the relative positon of the outer sensing insert 105 with the substrate 410 may assist in orienting the outer sensing insert 105 with the fluid delivery container 100.

Figure 4:
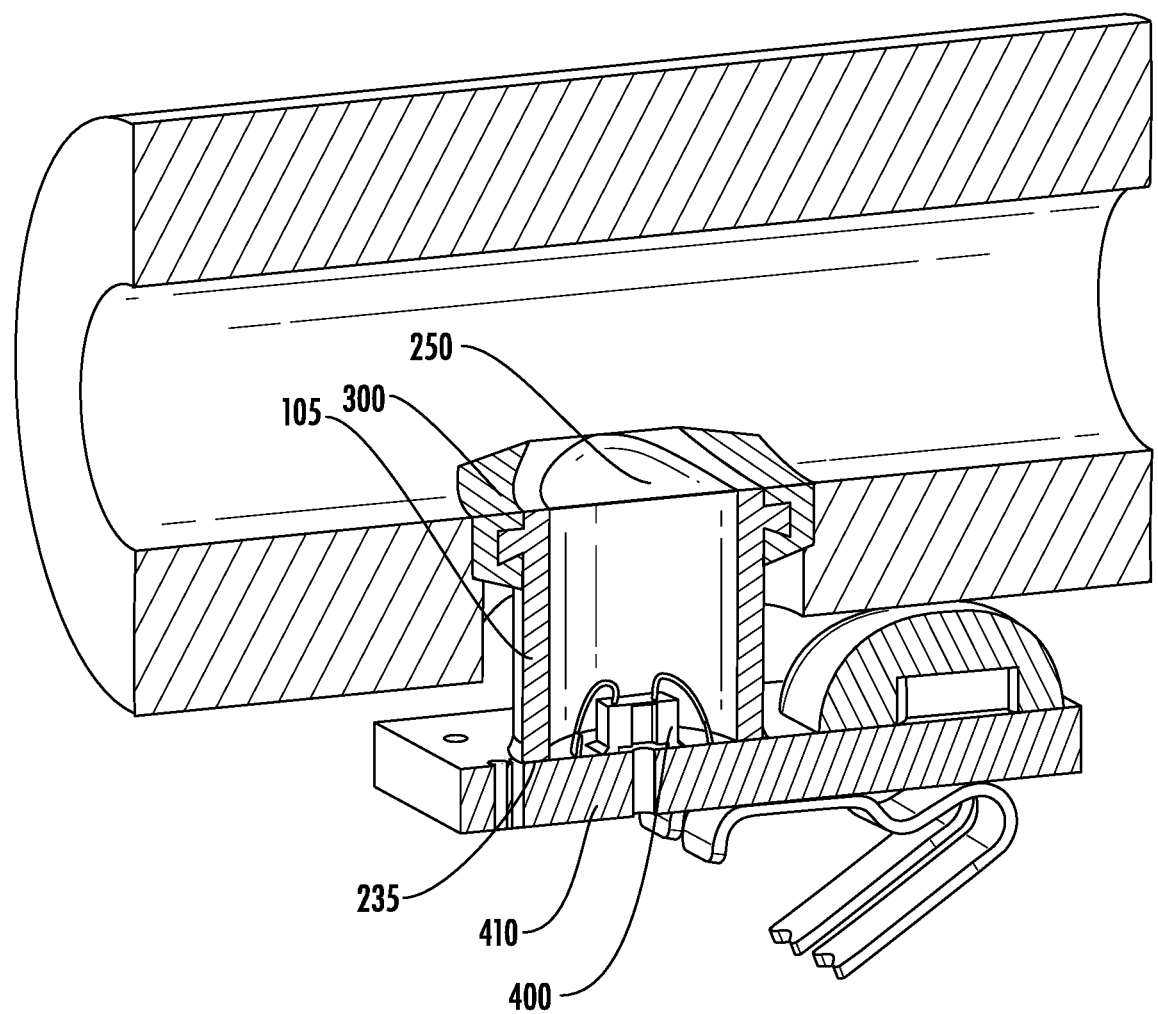
FIG. 4 illustrates a cut-away view of a contoured sensing insert including a sensing die operably coupled to a fluid flow container in accordance with various embodiments.

FIG. 4 illustrates a cut-away view of pressure sensor assembly including a contoured sensing insert with a sensing die operably coupled to a fluid flow container. As shown, the sensing element 400 may be defined within the inner sensing medium 250. In some embodiments, the sensing element 400 may be attached to a substrate 410, which may be coupled to the bottom surface of the outer sensing insert 105. In various embodiments, the sensing element 400 may be a sensing die. In various embodiments, the sensing element 400 may be in communication with a processor configured to determine the pressure of the fluid flowing through the fluid flow container 100 based on the deflection of the sensing element 400. As the inner sensing medium is configured to translate the pressure of the fluid in the fluid flow container 100, the pressure may be approximated based on the reading of the sensing element 400. The sense die itself may be attached to a base element, which itself is secured onto and/or partially within the open end of the outer sensing insert 105, such that the deflection of the inner sensing medium 250 may be transferred to the sensing element 400. The sensing element may include a Wheatstone bridge configured to correlate the level of stress of the surface of the sense die to a force measured by the load cell. In some embodiments, the sensing element 400 may be preloaded to experience a set amount of pressure in an instance in which there is no pressure actually applied by the fluid in the fluid flow container. For clarity, the amount of force (pull force and/or push force) may be measured by proxy by the Wheatstone bridge, by measuring the amount of stress of the surface of the sensing element. When a load is brought to the center of the die, the Wheatstone bridge produces a differential output voltage from the standard piezoresistive Wheatstone bridge that is proportional to the applied load. In various embodiments, the pressure sensor assembly may be attached to a substrate 410. The sensing element 400 may be adhered or otherwise secured to a top surface of the substrate 410, along with the substrate, which is adhered or otherwise secured to the top surface of the substrate 410. The sensing element 400 may be further connected with the PCB via the connected wire bonds. The base surface and the outer sensing insert 105 may be press fitted together.

What is claimed is:

1. A pressure sensor assembly configured for sensing a fluid pressure within a fluid flow container, the pressure sensor assembly comprising:
    a contoured sensing insert comprising:
        an outer sensing insert having an open interior through-hole and a top contoured surface configured to be secured at least partially within the fluid flow container, wherein the top contoured surface defines a first curved surface and a second curved surface corresponding with an interior wall contour of the fluid flow container;
        an inner sensing medium defined within the through-hole of the outer sensing insert, wherein the inner sensing medium defines a conforming contoured surface matching the first curved surface and the second curved surface of the top contoured surface; and
        a coupling gasket configured to align and secure the outer sensing insert with the fluid flow container, wherein the coupling gasket has a curvature corresponding with the interior wall contour of the fluid flow container.

2. The pressure sensor assembly of claim 1, wherein the fluid flow container defines a tubular shape configured with a through-hole configured to receive a flow of fluid during operation.

3. The pressure sensor assembly of claim 2, wherein the conforming contoured surface of the inner sensing medium is configured for direct contact with a fluid flowing through the fluid flow container.

4. The pressure sensor assembly of claim 3, wherein the top contoured surface of the outer sensing insert and the conforming contoured surface of the inner sensing medium are configured to fit flush with an interior curvature of the through-hole of the fluid flow container.

5. The pressure sensor assembly of claim 1, wherein the outer sensing insert further defines an annular protrusion surrounding an exterior surface of the outer sensing insert, wherein the annular protrusion is configured to engage the coupling gasket to operably couple the outer sensing insert with the fluid flow container.

6. The pressure sensor assembly of claim 5, wherein at least one of the coupling gasket or the inner sensing medium comprises a silicon rubber material.

7. The pressure sensor assembly of claim 6, wherein the outer sensing insert comprises a silicone compatible plastic.

8. The pressure sensor assembly of claim 1, wherein the outer sensing insert defines a bottom surface opposite the top contoured surface, wherein a base element is attached to the bottom surface.

9. The pressure sensor assembly of claim 8, wherein a sensing die is attached to the base element, wherein the sensing die is positioned within the inner sensing medium.

10. The pressure sensor assembly of claim 1, wherein the fluid flow container defines a sidewall aperture of varying cross-section such that a first level surface and second level surface of a fluid flow container interface surface of the outer sensing insert engages with the sidewall aperture.

11. The pressure sensor assembly of claim 1, wherein the top contoured surface has the surface contour corresponding with the interior wall contour of the fluid flow container such that a radius of curvature of the top contoured surface matches with a radius of curvature of the interior wall contour of the fluid flow container.

12. A method of manufacturing a pressure assembly, the method comprising:

provoding an outer sensing insert having an open interior through-hole and a top contoured surface configured to be secured at least partially within a fluid flow container, wherein the top contoured surface defines a first curved surface and a second curved surface corresponding with an interior wall contour of the fluid container;

dispensing an inner sensing medium within the through-hole of the outer sensing insert to define a conforming contoured surface matching the first curved surface and the second curved surface of the top contoured surface;

a coupling gasket configured to align and secure the outer sensing insert with the fluid flow container, wherein the coupling gasket has a curvature corresponding with the interior wall contour of the fluid flow container; and curing the inner sensing medium within the through hole of the outer sensing insert.

13. The method of claim 12, wherein the fluid flow container defines a tubular shape configured with a thoughhole configured to receive a flow of fluid during operation.

14. The method of claim 13, wherein the conforming contoured surface of the inner sensing medium is configured for direct contact with a fluid flowing through the fluid flow container.

15. The method of claim 12, wherein the outer sensing insert further defines an annular protrusion surrounding an exterior surface of the outer sensing insert, wherein the annular protrusion is configured to engage a coupling gasket to operably couple the outer sensing insert with the fluid flow container.

16. The method of claim 15, wherein at least one of the coupling gasket or the inner sensing medium comprises a liquid silicone rubber.

17. The method of claim 16, wherein the outer sensing insert comprises a silicone compatible plastic.

18. The method of claim 12, further comprising attaching a bottom surface of the outer sensing insert opposite the top contoured surface to a base element.

19. The method of claim 18, further comprising attaching a sensing die to the base element, wherein the sensing die is positioned within the inner sensing medium.

20. The method of claim 12, wherein the fluid flow container defines a sidewall aperture of varying cross-section such that a first level surface and second level surface a fluid flow container interface surface of the outer sensing insert engages with the sidewall aperture.

* * * * *